(12) United States Patent
Aoki et al.

(10) Patent No.: US 8,001,484 B2
(45) Date of Patent: Aug. 16, 2011

(54) INFORMATION PROCESSING APPARATUS AND METHOD, AND PROGRAM

(75) Inventors: Shunsuke Aoki, Kanagawa (JP);
Tomoyuki Yamamoto, Kanagawa (JP);
Kazuhito Sumiyoshi, Tokyo (JP);
Setsushi Minami, Tokyo (JP); Jun Kaneko, Kanagawa (JP)

(73) Assignee: Sony Corporation, Tokyo (JP)

( * ) Notice: Subject to any disclaimer, the term of this patent is extended or adjusted under 35 U.S.C. 154(b) by 257 days.

(21) Appl. No.: 11/597,859

(22) PCT Filed: May 10, 2005

(86) PCT No.: PCT/JP2005/008499
§ 371 (c)(1),
(2), (4) Date: Nov. 28, 2006

(87) PCT Pub. No.: WO2005/116872
PCT Pub. Date: Dec. 8, 2005

(65) Prior Publication Data
US 2007/0234225 A1 Oct. 4, 2007

(30) Foreign Application Priority Data

May 31, 2004 (JP) .................................. 2004-161848

(51) Int. Cl.
*G06F 3/048* (2006.01)
*H04N 5/445* (2006.01)
(52) U.S. Cl. ............... 715/780; 725/39; 725/51; 725/53
(58) Field of Classification Search .................. 715/780, 715/741, 742; 725/39, 48, 49, 51, 53
See application file for complete search history.

(56) References Cited

U.S. PATENT DOCUMENTS

| 6,925,650 | B1 * | 8/2005 | Arsenault et al. | 725/39 |
|---|---|---|---|---|
| 7,107,548 | B2 * | 9/2006 | Shafron | 715/826 |
| 7,296,237 | B2 * | 11/2007 | Crocker et al. | 715/750 |
| 7,308,488 | B2 * | 12/2007 | Doyle et al. | 709/219 |
| 7,346,668 | B2 * | 3/2008 | Willis | 709/219 |
| 7,363,282 | B2 * | 4/2008 | Karnawat et al. | 706/45 |
| 7,665,109 | B2 * | 2/2010 | Matthews et al. | 725/51 |
| 2001/0018704 | A1 | 8/2001 | Kikugawa | |
| 2002/0059596 | A1 * | 5/2002 | Sano et al. | 725/39 |
| 2002/0078453 | A1 * | 6/2002 | Kuo | 725/46 |
| 2003/0141993 | A1 * | 7/2003 | Baldwin et al. | 341/50 |
| 2003/0194141 | A1 * | 10/2003 | Kortum et al. | 382/239 |
| 2004/0139465 | A1 * | 7/2004 | Matthews et al. | 725/51 |

(Continued)

FOREIGN PATENT DOCUMENTS

AU     2001 018318     2/2001

(Continued)

*Primary Examiner* — Simon Ke
*Assistant Examiner* — Rashawn Tillery
(74) *Attorney, Agent, or Firm* — Frommer Lawrence & Haug LLP; William S. Frommer; Thomas F. Presson

(57) ABSTRACT

A content introduction screen linked to relevant sites can easily be created. A content-information input screen is displayed. When content information has been completely input, then, link elements are extracted from the content information. Then, one of the link elements is selected. A site related to the link element is searched for. A content introduction screen in which the input content information is linked to the searched site is generated and displayed. Metadata, including the content information, the URL, etc., which are used to generate the content introduction screen, is stored.

9 Claims, 11 Drawing Sheets

U.S. PATENT DOCUMENTS

| | | | |
|---|---|---|---|
| 2004/0194141 A1* | 9/2004 | Sanders | 725/53 |
| 2004/0268395 A1* | 12/2004 | Han | 725/48 |
| 2005/0097606 A1* | 5/2005 | Scott et al. | 725/52 |
| 2005/0160465 A1* | 7/2005 | Walker | 725/86 |
| 2005/0192946 A1* | 9/2005 | Lu et al. | 707/3 |
| 2005/0228780 A1* | 10/2005 | Diab et al. | 707/3 |

FOREIGN PATENT DOCUMENTS

| | | |
|---|---|---|
| CA | 2 335 219 | 8/2001 |
| CN | 1310423 | 8/2001 |
| EP | 1 128 288 | 8/2001 |
| JP | 11 195025 | 7/1999 |
| JP | 2001 236277 | 8/2001 |
| JP | 2002 366618 | 12/2002 |
| JP | 2004 139304 | 5/2004 |
| KR | 2001 085572 | 9/2001 |
| RU | 2 245 577 | 2/2001 |

* cited by examiner

FIG. 5

POST A NEW PROGRAM

Enter the title of the program and the URL of the program, if any.
PROGRAM TITLE
PROGRAM URL Enter the date on which the program was broadcast or will be broadcast.
(If a date is not entered, today's date will be used.)
☐(MONTH) ☐(DAY) ☐(YEAR)

Enter a description of the program. The entered text will be the narrative text of the TELE-PROG.

If the program is broadcast every ? or is broadcast every weekday, select an item from the combo-box below.
(If the program is a one-time program, select others.)

Enter the names of persons, such as performers, directors, and writers, using "," as a separator.
(Insert a space between the first name and family name.)

Select a channel from the compo-box below.
Channel

Enter keywords for the program, impressive scenes, related products, etc. (Insert "," as a separator between the words.)

Select the start time and end time of the program.
If a late night/early morning program, enter the previous day of the week.
(e.g., if the program is broadcast on Tuesday at 1:53 a.m., select "every Monday" in the day-of-week field above and "01:53" in the time field below.)
START 00 : 00 — END 00 : 00

○ USE SEARCH ▷▷▷▷ [GENERATION OF METADATA] — B1
SITE

FIG. 6

POST A NEW PROGRAM

Enter the date on which the program was broadcast or will be broadcast.
(If a date is not entered, today's date will be used.)
01 (MONTH) 15 (DAY) 2004 (YEAR)
If the program is broadcast every ?
or is broadcast every weekday,
select an item from the combo-box below.
(If the program is a one-time program, select others.)
every Thursday ▼

Select a channel from the compo-box below.
Channel  TAS CH-6 ▼
         MHK main channel CH-1
Select the  MHK educational channel CH-3
If a late nig  NICHI-NICHI TV CH-4
(e.g., if the  TAS CH-6
START  20  BUJI TV CH-8
       EN  TV SUNSET CH-10
           TV DAI-TOKYO CH-12

Enter the title of the program and the URL of the program, if any.
PROGRAM TITLE  UTABEN
PROGRAM URL    http://www.tas.co.jp/utaben/

Enter a description of the program. The entered text will be the narrative text of the TELE-PROG.

Good selection of music from the early days of UTABEN to 2003!
A collection of "music inside story" interviews and classic film clips will be broadcast.

Enter the names of persons, such as performers, directors, and writers, using "," as a separator.
(Insert a space between the first name and family name.)
HIKARI UKITA, SNAB Enter keywords for the program, impressive scenes, related products, etc. (Insert "," as a separator between the words.)
xxxx

▷▷▷▷▷ GENERATION OF METADATA — B1

UTABEN

---UTABEN---

- BROADCAST DATE::EVERY THURSDAY 20:00 - 20:54 (TAS CH-6)

PERFORMERS::HIKARI UKITA, SNAB (USE BUTTON) ~B2

FIG. 8

```
...<B>
<FONT SIZE=4><A HREF= "http://www.tas.co.jp/utaben/"> UTABEN</A></FONT>
</B>...
<BR><FONT SIZE = 2> <LI>BROADCAST DATE::EVERY THURSDAY 20:00 - 20:54</FONT>
<FONT SIZE=2><A HREF=["http://www.tas.co.jp/"]>( <I>TBS CH-6</I> )</A></FONT>

PERFORMERS::<A HREF=["http://www.teshoba-emi.co.jp/hokka/"]>HIKARI UKITA</A>,
<A HREF=["http://www.jvcmusic.co.jp/a_list/artist_j/snab/"]>SNAB</A>
```

FIG. 9

JANUARY 13,2004

UTABEN

---UTABEN---
• BROADCAST DATE::EVERY THURSDAY 20:00 - 20:54 (TAS CH-6)

PERFORMERS::HIKARI UKITA, SNAB (USE BUTTON)

Posted by ABC at January 13,2004 10:59 AM | TRACKBACK

COMMENT
  xxxxx

COMMENT
  xxxxx

INFORMATION PROCESSING APPARATUS AND METHOD, AND PROGRAM

TECHNICAL FIELD

The present invention relates to information processing apparatuses and methods, and programs, and to an information processing apparatus and method capable of effectively providing information on content, and a program.

BACKGROUND ART

There exist services for introducing information regarding content provided via transmission media over networks, such as the Internet. A service for providing a program guide for programs to be broadcast on television is a representative example of the services.

In this service, the broadcast times of programs to be broadcast, the names of broadcast stations, the names of performers, the contents of the programs, and so forth are provided via the Internet. A user is able to access the provided information to determine a program to be viewed.

Since the program guide is published on the Internet, during the use of the program guide, a user may use a search site to search for information of particularly interest (e.g., the performers) through a homepage related to the information (Patent Document 1). In this case, the user accesses the search site to search for homepages for the performers, etc., using the name of the performers, etc., as keywords.
[Patent Document 1]
Japanese Unexamined Patent Application Publication No. 2002-32413

DISCLOSURE OF INVENTION

Problems to be Solved by the Invention

For example, a program guide containing links to homepages for the performers, etc., facilitates a user to search for a desired homepage. However, a specific method for linking a program guide to the homepages for the performers, etc., has not been disclosed.

The present invention has been made in view of such circumstances, and aims to efficiently create a link to a related homepage when generating a content introduction screen.

Means for Solving the Problems

According to the present invention, there is provided an information processing apparatus. The information processing apparatus includes first generating means or a first generating unit that generates a content-information input screen for inputting content information, input means or an input unit that inputs the content information through the content-information input screen, extracting means or an extracting unit that extracts a link element from the content information input by the input means or input unit, first storage means or a first storage unit that stores link destinations of predetermined link elements, obtaining means or an obtaining unit that obtains a link destination associated with the link element extracted by the extracting means or extracting unit using the first storage means and/or an external search site, and second generating means or a second generating unit that generates a content introduction screen that is linked to the link element associated with the link destination obtained by the obtaining means or obtaining unit.

The obtaining means can use the external search site to obtain a desired link destination when the link destination is not obtained from the first storage means.

The obtaining means can determine the validity of a site of the link destination when obtaining the link destination using the external search site.

The information processing apparatus can further include second storage means for storing the content information input by the input means and the link destination obtained by the obtaining means as metadata, and the first generating means can use the metadata stored in the second storage means to generate the content-information input screen in which predetermined content information has been entered.

The information processing apparatus can further include metadata obtaining means for obtaining metadata generated by another information processing apparatus, and the first generating means can use the metadata obtained by the metadata obtaining means to generate the content-information input screen in which predetermined content information has been entered.

According to the present invention, there is provided an information processing method. The information processing method includes a first generating step of generating a content-information input screen for inputting content information, an inputting step of inputting the content information through the content-information input screen, an extracting step of extracting a link element from the content information input in the processing of the inputting step, an obtaining step of obtaining a link destination associated with the link element extracted in the processing of the extracting step using storage means for storing link destinations of predetermined link elements and/or an external search site, and a second generating step of generating a content introduction screen that is linked to the link element associated with the link destination obtained in the processing of the obtaining step.

According to the present invention, there is provided a program. The program causes a computer to execute a process including a first generating step of generating a content-information input screen for inputting content information, an inputting step of inputting the content information through the content-information input screen, an extracting step of extracting a link element from the content information input in the processing of the inputting step, an obtaining step of obtaining a link destination associated with the link element extracted in the processing of the extracting step, and a second generating step of generating a content introduction screen that is linked to the link element associated with the link destination obtained in the processing of the obtaining step.

In the information processing apparatus and method, and program of the present invention, a content-information input screen for inputting content information is generated; the content information is input through the content-information input screen; a link element is extracted from the content information input in the processing of the inputting step; a link destination associated with the extracted link element is obtained using storage means for storing link destinations of predetermined link elements and/or an external search site; and a content introduction screen that is linked to the link element associated with the obtained link destination is generated.

According to the present invention, when a content introduction screen is generated, a link to a related homepage can be efficiently created.

BRIEF DESCRIPTION OF THE DRAWINGS

FIG. 5 is a diagram showing an example of a content-information input screen.

FIG. 6 is a diagram showing an example of the content-information input screen in which content information has been entered.

FIG. 7 is a diagram showing an example of a content introduction screen.

FIG. 8 is a diagram showing an example of metadata.

FIG. 9 is a diagram showing another example of the content introduction screen.

Figure 1:
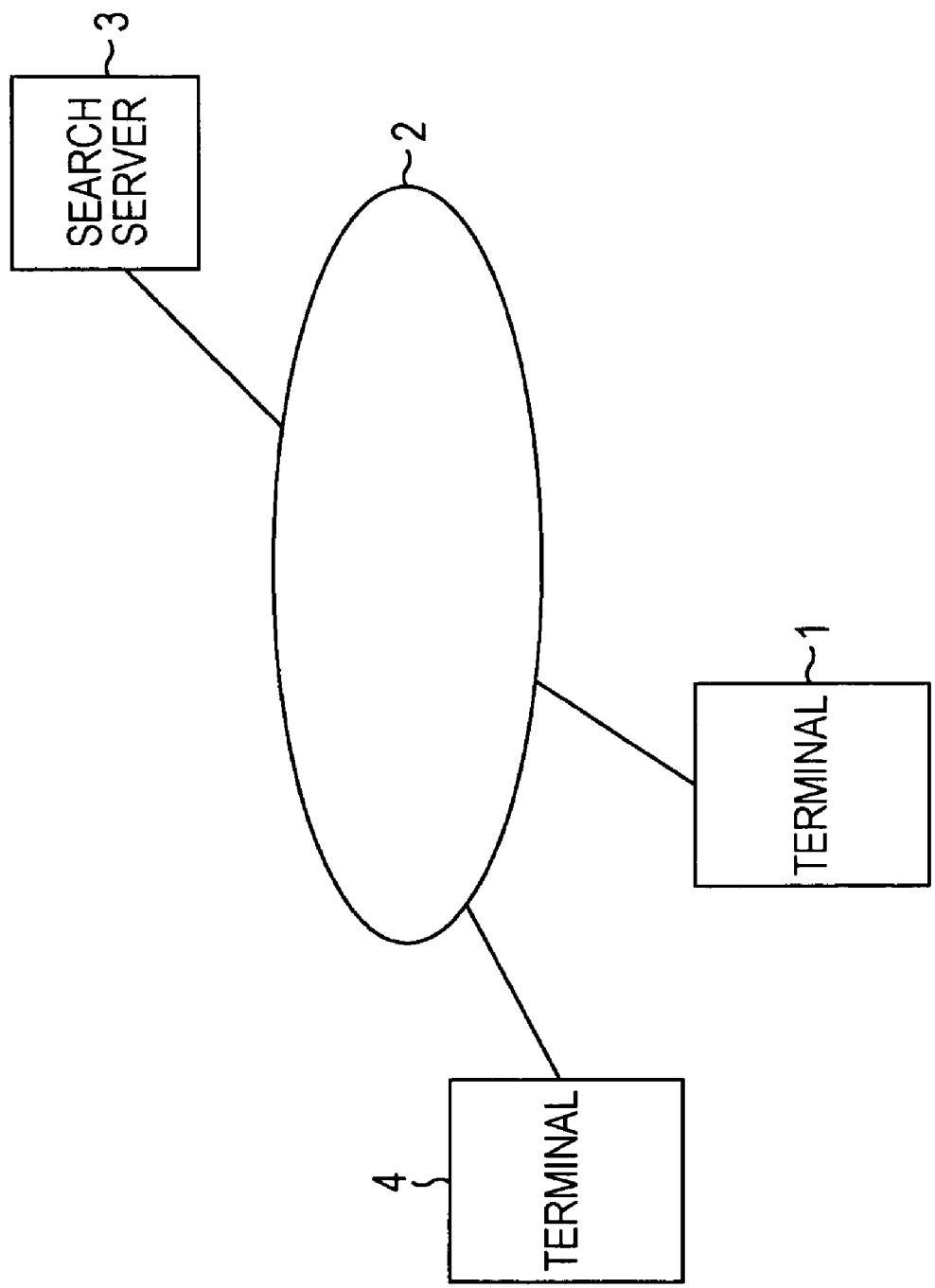
FIG. 1 is a diagram showing an example of the use of a terminal that provides the present invention.

REFERENCE NUMERALS 1 terminal
2 network
3 search server
4 terminal
51 content information input unit
52 control unit
53 link-destination database
54 network I/F unit
55 content-information input screen generating unit
56 metadata storage unit
57 metadata obtaining unit
58 display unit
71 link-destination obtaining unit
72 content introduction screen generating unit
73 output control unit

BEST MODE FOR CARRYING OUT THE INVENTION

Before describing an embodiment of the present invention, the correspondence between the features of the invention set forth herein and the specific elements disclosed in an embodiment of the present invention is discussed below. This description is intended to assure that an embodiment supporting the invention set forth herein is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the invention.

Furthermore, this description should not be construed as restricting that all the aspects of the invention disclosed in the embodiment are described in the specification. That is, the description does not deny the existence of aspects of the present invention that are described in the specification but not claimed in the invention of this application, i.e., the existence of aspects of the present invention that in future may be claimed by a divisional application, or that may be additionally claimed through amendments.

According to the present invention, there is provided an information processing apparatus (for example, a terminal 1 shown in FIG. 1). The information processing apparatus includes first generating means (for example, a content-information input screen generating unit 55 shown in FIG. 3) for generating a content-information input screen for inputting content information, input means (for example, a content information input unit 51 shown in FIG. 3) for inputting the content information through the content-information input screen, extracting means (for example, a control unit 52 shown in FIG. 3) for extracting a link element from the content information input by the input means, first storage means (for example, a link-destination database 53 shown in FIG. 3) for storing link destinations of predetermined link elements, obtaining means (for example, the control unit 52 shown in FIG. 3) for obtaining a link destination associated with the link element extracted by the extracting means, using the first storage means and/or an external search site and second generating means (for example, the control unit 52 shown in FIG. 3) for generating a content introduction screen that is linked to the link element associated with the link destination obtained by the obtaining means.

When the link destination is not obtained from the first storage means, the obtaining means uses the external search site to obtain a desired link destination.

The obtaining means determines the validity of a site of the link destination when obtaining the link destination using the external search site.

The information processing apparatus can further include second storage means (a metadata storage unit 56 shown in FIG. 3) for storing the content information input by the input means and the link destination obtained by the obtaining means as metadata, and the first generating means can use the metadata stored in the storage means to generate the content-information input screen in which predetermined content information has been entered.

The information processing apparatus can further include metadata obtaining means (for example, a metadata obtaining unit 57 shown in FIG. 3) for obtaining metadata generated by another information processing apparatus, and the first generating means can use the metadata obtained by the metadata obtaining means to generate the content-information input screen in which predetermined content information has been entered.

According to the present invention, there is provided an information processing method. The information processing method includes a first generating step (for example, step S1 of FIG. 4) of generating a content-information input screen for inputting content information, an inputting step (for example, step S2 of FIG. 4) of inputting the content information through the content-information input screen, an extracting step (for example, step S3 of FIG. 4) of extracting a link element from the content information input in the processing of the inputting step, an obtaining step (for example, steps S4 through S8 of FIG. 4) of obtaining a link destination associated with the link element extracted in the processing of the extracting step using storage means for storing link destinations of predetermined link elements and/or an external search site, and a second generating step (for example, step S9 of FIG. 4) of generating a content introduction screen that is linked to the link element associated with the link destination obtained in the processing of the obtaining step.

FIG. 1 is a diagram showing an example of the use of a terminal 1 to which the present invention is applied.

The terminal 1 sets up a homepage on a network 2 for introducing, for example, a program to be broadcast on television. As described below, once information concerning the program to be introduced (hereinafter referred to as "content information") has been entered, the terminal 1 searches for a site related to predetermined content information (e.g., the broadcast station that broadcasts the program or the performers on the program), and creates a page composed of a content introduction screen that is linked to the searched site.

A search server 3 searches for a site related to the broadcast station, the performers, or the like in response to, for example, a request from the terminal 1, and transmits a search result to the terminal 1 via the Internet 2.

A user of a terminal 4 is able to access the program introduction page of the terminal 1 via the Internet 2.

Figure 2:
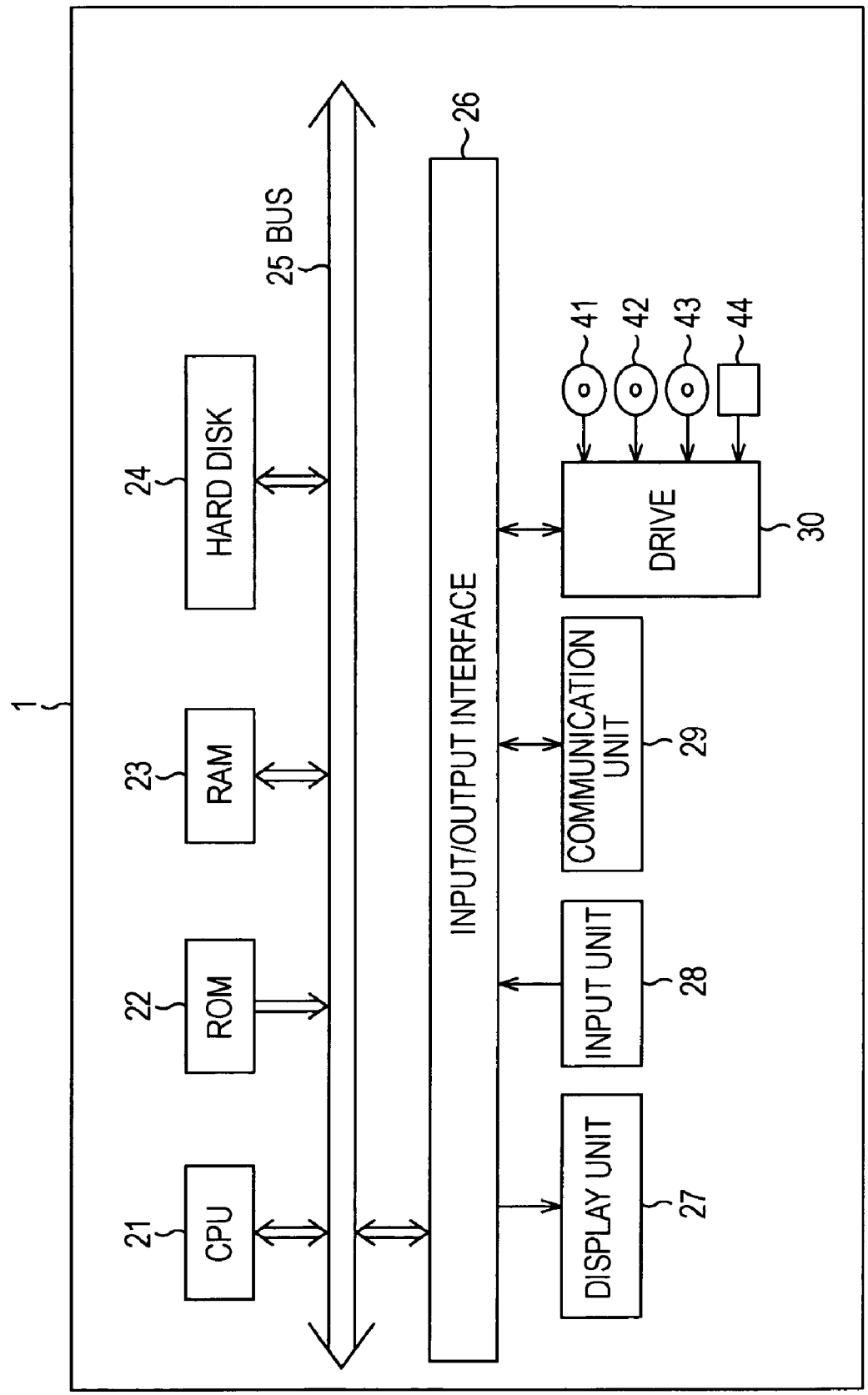
FIG. 2 is a block diagram showing an example structure of the terminal shown in FIG. 1.

FIG. 2 shows an example structure of the terminal 1.

A CPU (Central Processing Unit) 21 executes various types of processing according to a program loaded from an ROM (Read Only Memory) 22 or a hard disk 24 into an RAM (Random Access Memory) 23. The RAM 23 also stores data, etc., necessary for the CPU 21 to execute the various types of processing, if necessary.

The CPU 21, the ROM 22, and the RAM 23 are connected to one another via a bus 25. An input/output interface 26 is also connected to the bus 25.

The input/output interface 26 is connected to an input unit 28 including a keyboard, a mouse, and so forth, a display unit 27 including a display, such as a CRT (Cathode Ray Tube) or an LCD (Liquid Crystal display), a speaker, and so forth, and a communication unit 29 including a modem, a terminal adapter, and so forth. The communication unit 29 performs communication processing via the Internet 2.

The input/output interface 26 is also connected to a drive 30, if necessary, and a recording medium having a program of the present invention recorded thereon is attached to the drive 30. A computer program read from the recording medium is installed into the hard disk 24, as needed.

The recording medium is a magnetic disk 41, an optical disk 42, a magneto-optical disk 43, a semiconductor memory 44, or the like.

Figure 3:
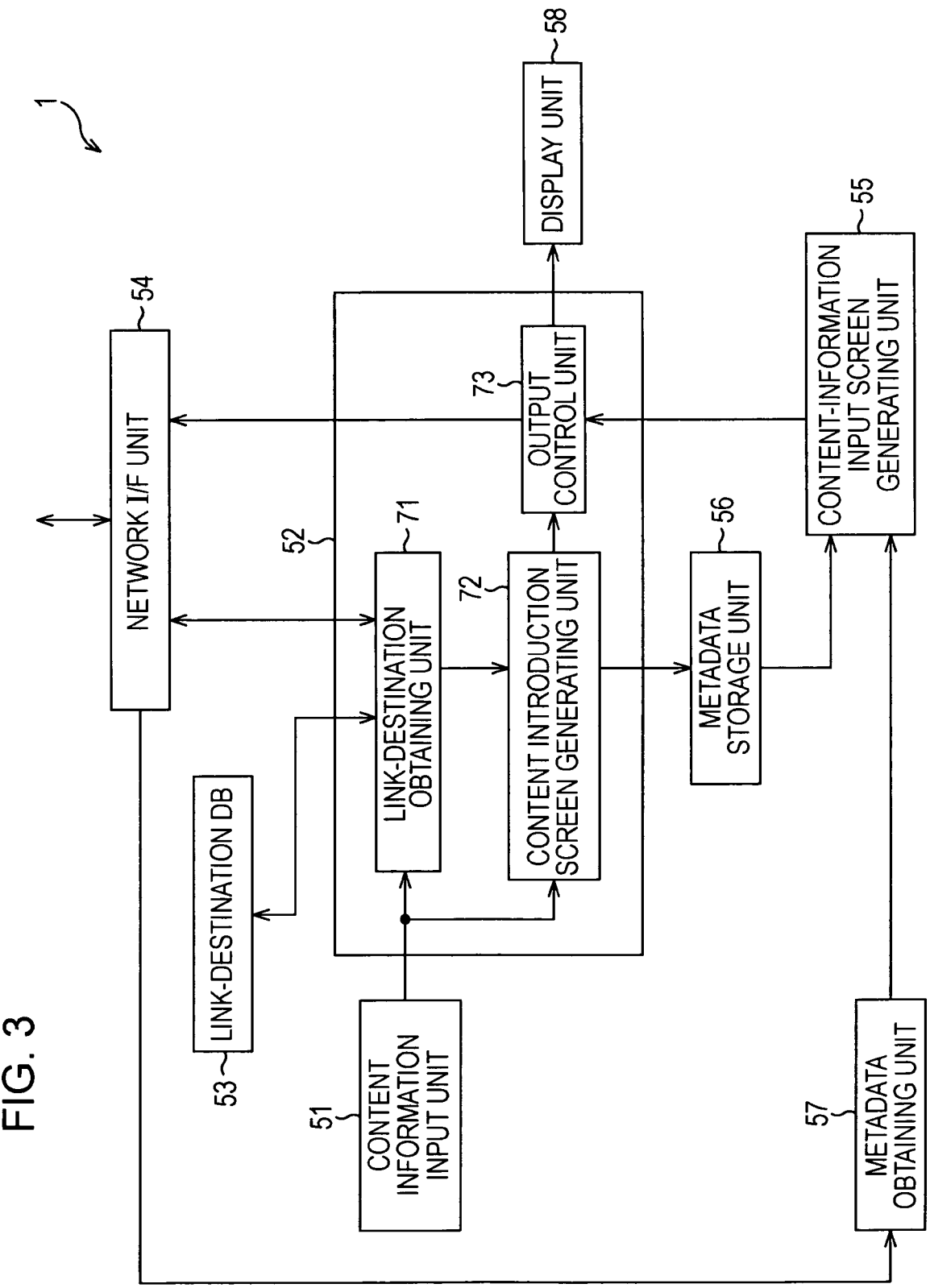
FIG. 3 is a block diagram showing an example functional structure of the terminal shown in FIG. 1.

FIG. 3 shows an example functional structure of the terminal 1.

A content information input unit 51 (which is implemented by the CPU 21, the ROM 22, the RAM 23, the display unit 27, and the input unit 28 shown in FIG. 2) inputs content information concerning a program to be displayed on a content introduction screen (such as the name of the broadcast station, the broadcast start time and end time, the names of the performers, and the description of the contents of the program), and supplies the content information to a control unit 52.

The control unit 52 (which is implemented by the CPU 21, the ROM 22, and the RAM 23 shown in FIG. 2) controls the individual units. For example, the control unit 52 (a link-destination obtaining unit 71) extracts content information whose associated site will exist or a word contained in the content information (hereinafter referred to as a "link element") from the content information input from the content information input unit 51. For example, the name of the broadcast station and the names of the performers are extracted as link elements.

The control unit 52 (the link-destination obtaining unit 71) detects the URL of the site related to the extracted link element from a link-destination database 53 (which is implemented by the CPU 21, the ROM 22, the RAM 23, and the hard disk 24 shown in FIG. 2), or communicates with the search server 3 via a network I/F unit 54 (which is implemented by the communication unit 29 shown in FIG. 2) to cause the search server 3 to search for the site related to the link element. The link-destination database 53 has stored therein in advance the URLs of sites related to predetermined link elements (such as the broadcast station and the performers).

The control unit 52 (a content introduction screen generating unit 72) generates a content introduction screen with a link to the content information whose associated site has been detected, on which the content information is displayed. The control unit 52 (the content introduction screen generating unit 72) stores the content information used to generate the content introduction screen or the URL as metadata in a metadata storage unit 56 (which is implemented by the hard disk 24 shown in FIG. 2).

The control unit 52 (an output control unit 73) publishes a homepage including the thus generated content introduction screen on the Internet 2 via the network I/F unit 54.

A content-information input screen generating unit 55 supplies a content-information input screen for inputting the content information to the control unit 52. As described in detail below, the content-information input screen generating unit 55 supplies a default content-information input screen to the control unit 52. Alliteratively, the content-information input screen generating unit 55 generates a content-information input screen having predetermined information entered therein using metadata that is used by the control unit 52 to generate the content introduction screen and that is stored in the metadata storage unit 56 or metadata that is created outside and that is obtained via a metadata obtaining unit 57 (which is implemented by the CPU 21, the ROM 22, and the RAM 23 shown in FIG. 2), and supplies the generated content-information input screen to the control unit 52.

The control unit 52 (the output control unit 73) displays the content-information input screen supplied from the content-information input screen generating unit 55 on a display unit 58 (which is implemented by the display unit 27 shown in FIG. 2). That is, the content information input unit 51 acquires the content information entered in the displayed content-information input screen, and supplies the content information to the control unit 52.

Next, a content-introduction-screen generation process for the terminal 1 will be described with reference to the flowchart of FIG. 4.

In step S1, the control unit 52 (the output control unit 73) displays on the display unit 58 the content-information input screen supplied from the content-information input screen generating unit 55. The details of the processing are described below with reference to the flowchart of FIG. 10.

It is assumed herein that a default content-information input screen shown in FIG. 5 is displayed on the display unit 58.

The content-information input screen shown in FIG. 5 includes fields into which the broadcast date of a program to be introduced, the broadcast day of the week, the name of the broadcast station, the broadcast start time and end time, the title and URL of the program, the description of the program, the names of the performers, keywords for the program, and so forth are to be entered. In default, no data has been entered in the respective fields.

In step S2, the control unit 52 stands by until content information has been completely entered in the content-information input screen displayed in step S1. When the content information has been completely entered, the control unit 52 proceeds to step S3.

In this example, when the user of the terminal 1 operates a metadata-generation button B1 after entering predetermined content information into the respective fields of the content-information input screen in the manner shown in FIG. 6 by operating an operation unit (not shown), the content information input unit 51 reads the content information entered in the content-information input screen, and supplies the read content information to the control unit 52. When the content information is input from the content information input unit 51, the control unit 52 determines that the content information has been completely entered.

In step S3, the control unit 52 (the link-destination obtaining unit 71) extracts link elements from the content information entered in step S2.

For example, the name of the broadcast station and the names of the performers entered as the content information are extracted as link elements.

In step S4, the control unit 52 (the link-destination obtaining unit 71) selects one of the link elements extracted in step S3, and, in step S5, starts to detect the URL of the site related to the selected link element from the link-destination database 53.

In step S6, the control unit 52 (the link-destination obtaining unit 71) determines whether or not the URL of the site related to the link element has been detected from the link-destination database 53. If it is determined that the URL has not been detected, then, in step S7, the control unit 52 accesses the search server 3 via the network I/F unit 54, and causes the search server 3 to search for the site related to the link element.

If the URL of the site related to the link element has been detected from the link-destination database 53 in step S6, or if the site related to the link element is searched for by the search server 3 in step S7, the process proceeds to step S8.

In step S8, the control unit 52 (the link-destination obtaining unit 71) determines whether or not all of the link elements extracted in step S3 have been selected in step S4. If it is determined that a remaining link element exists, the control unit 52 returns to step S4, and selects another link element to perform the processing after step S5.

If it is determined in step S8 that all of the link elements have been selected, then, in step S9, the control unit 52 (the content introduction screen generating unit 72) generates a content introduction screen, for example, as shown in FIG. 7, on which the URLs of the searched sites are displayed as HTML (Hyper Text Markup Language) links. The thus generated content introduction screen is displayed on a homepage of a program introduction site of the terminal 1.

In the example shown in FIG. 7, underlined content information ("UTABEN" as the title of the program, "TAS ch-6" as the name of the broadcast station, and "HIKARI UKITA" and "SNAB" as the names of the performers) is linked to the searched sites.

Referring back to FIG. 4, in step S10, the control unit 52 (the content introduction screen generating unit 72) stores in the metadata storage unit 56 XML (extensible Markup Language) metadata containing the content information, the URL, etc., which is used to generate the content introduction screen, as shown in, for example, FIG. 8.

As described above, link elements are extracted from the content information entered when the content introduction screen is generated, and the sites related to the link elements are searched for. Therefore, a content introduction screen linked to predetermined content information can easily be generated.

In the foregoing description, the site searched for in step S6 or S7 is directly used. Before providing a link, the validity of the site can be verified.

Specifically, as an example, since many sites for performers (performing artists) or broadcast stations include the word "authorized" or "official", the control unit 52 can create a link only to a site in the searched sites whose name contains the word "authorized" or "official".

By verifying the validity of the searched site, therefore, a link to a more closely related site can be created.

The content introduction screen may be specialized to a personal computer, a CE device, or a mobile phone, or may also be specialized to a predetermined television program.

Further, the content introduction screen may be displayed as a weblog screen, as shown in FIG. 9, so that items, such as comments of the program, can easily be provided.

Figure 10:
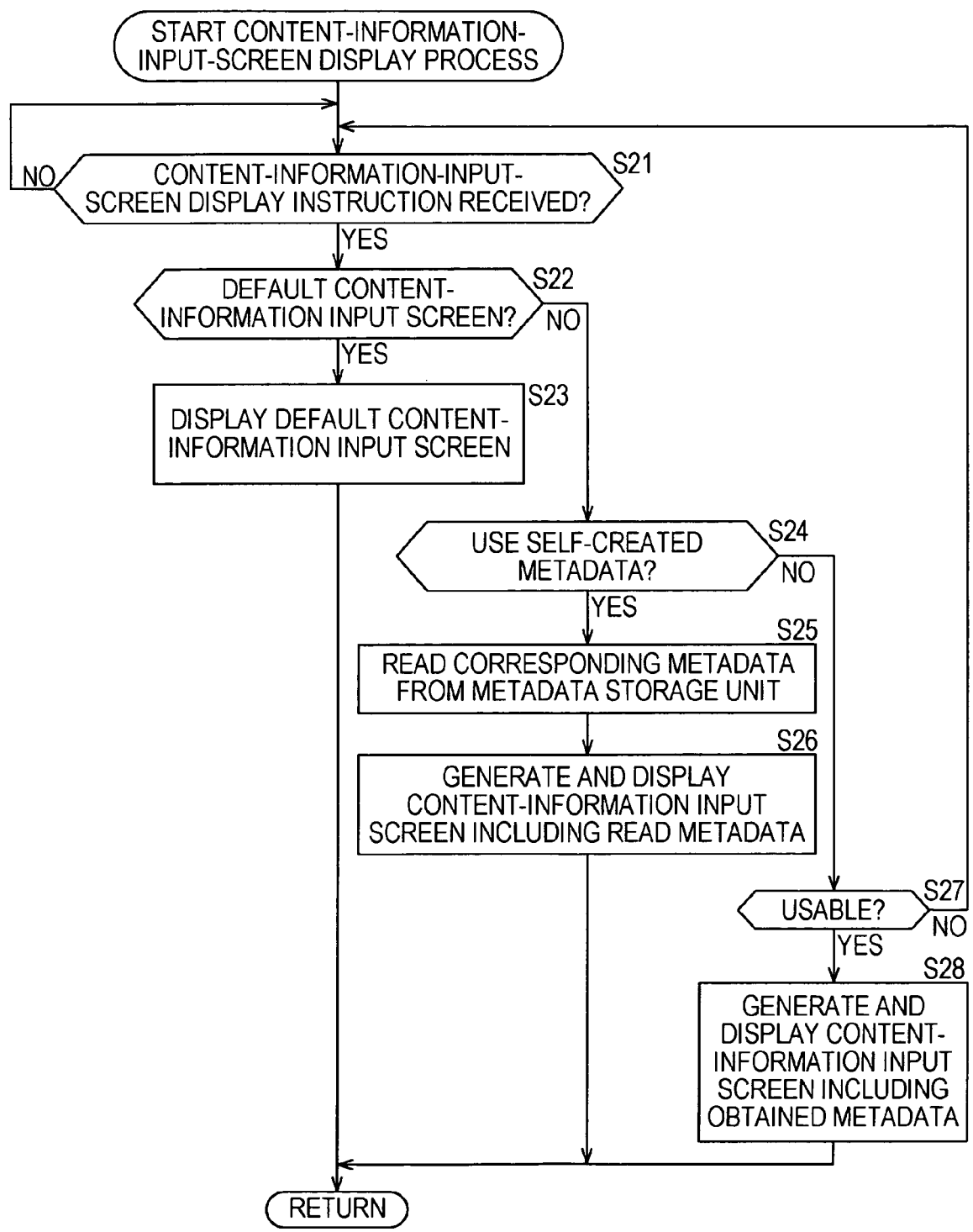
FIG. 10 is a flowchart showing a content-information-input-screen display process in step S1 of FIG. 4.

Next, the details of the content-information-input-screen display processing of step S1 will be described with reference to the flowchart of FIG. 10.

In step S21, the control unit 52 stands by until an instruction for displaying a content-information input screen has been input from an operation unit (not shown), and proceeds to step S22 when the instruction is input.

In step S22, the control unit 52 determines whether or not the instruction input in step S21 is an instruction for displaying a default content-information input screen. If so, then, in step S23, the control unit 52 notifies the content-information input screen generating unit 55 of that instruction. In response to the notification, the content-information input screen generating unit 55 supplies the default content-information input screen shown in FIG. 5 (an input screen having no data in the respective fields) to the control unit 52. The control unit 52 displays the default content-information input screen supplied from the content-information input screen generating unit 55 on the display unit 58.

If it is determined in step S21 that the input instruction is not an instruction for displaying a default content-information input screen, the control unit 52 determines that the instruction is an instruction for displaying a content-information input screen based on the reuse of metadata, and proceeds to step S24.

Figure 4:
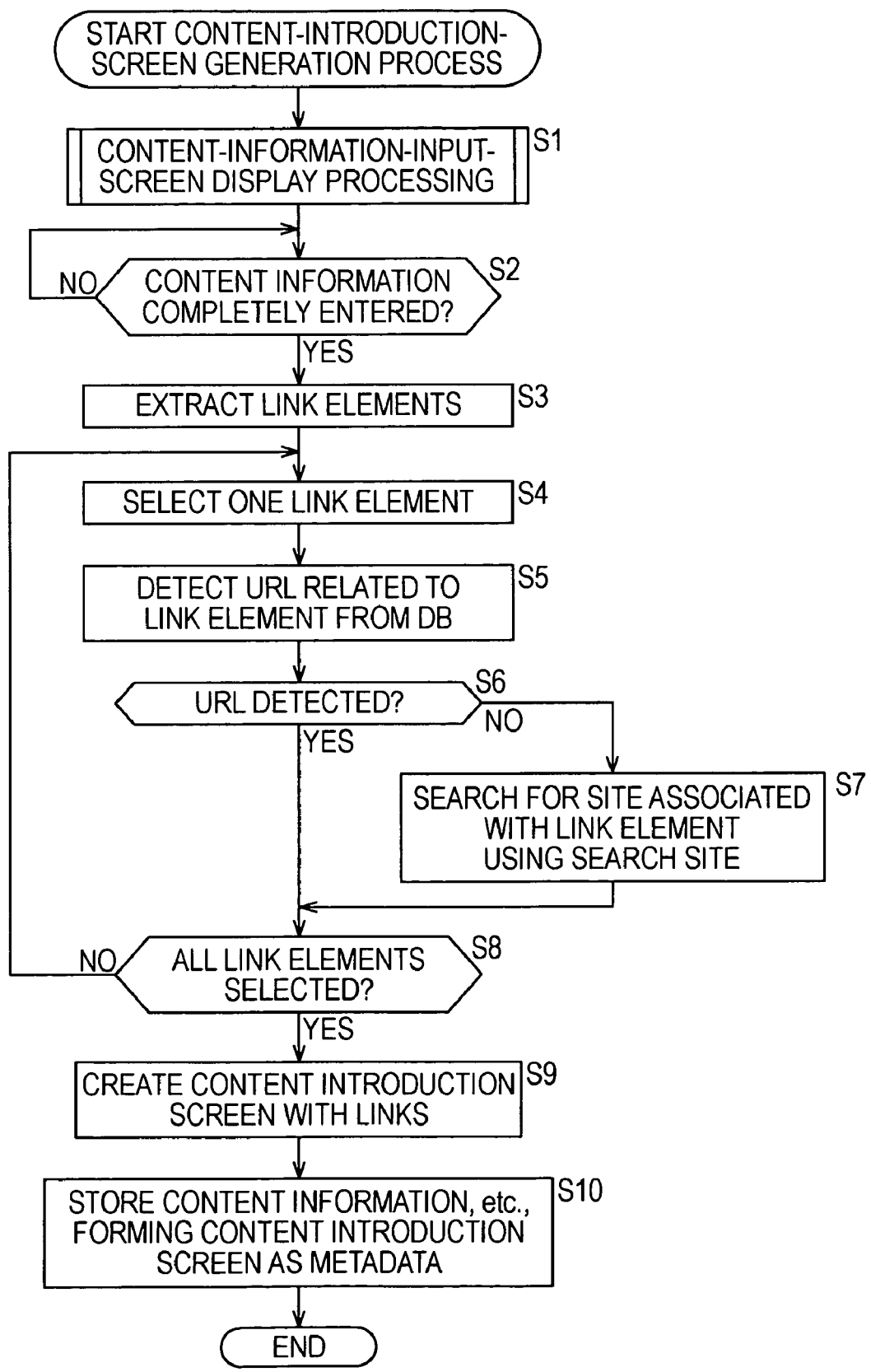
FIG. 4 is a flowchart showing a content-introduction-screen generation process.

In step S24, the control unit 52 determines whether or not the metadata to be reused is the metadata used in the content introduction screen created in step S9 of FIG. 4 (the self-created metadata). If so, the process proceeds to step S25.

For example, if a use button B2 on the content introduction screen created in step S9, shown in FIG. 7, which is displayed on the display unit 58, is operated, the control unit 52 determines that an instruction for displaying a content-information input screen based on the reuse of the metadata of the currently displayed content introduction screen has been input, and proceeds to step S25 through steps S21, S22, and S24.

Figure 11:
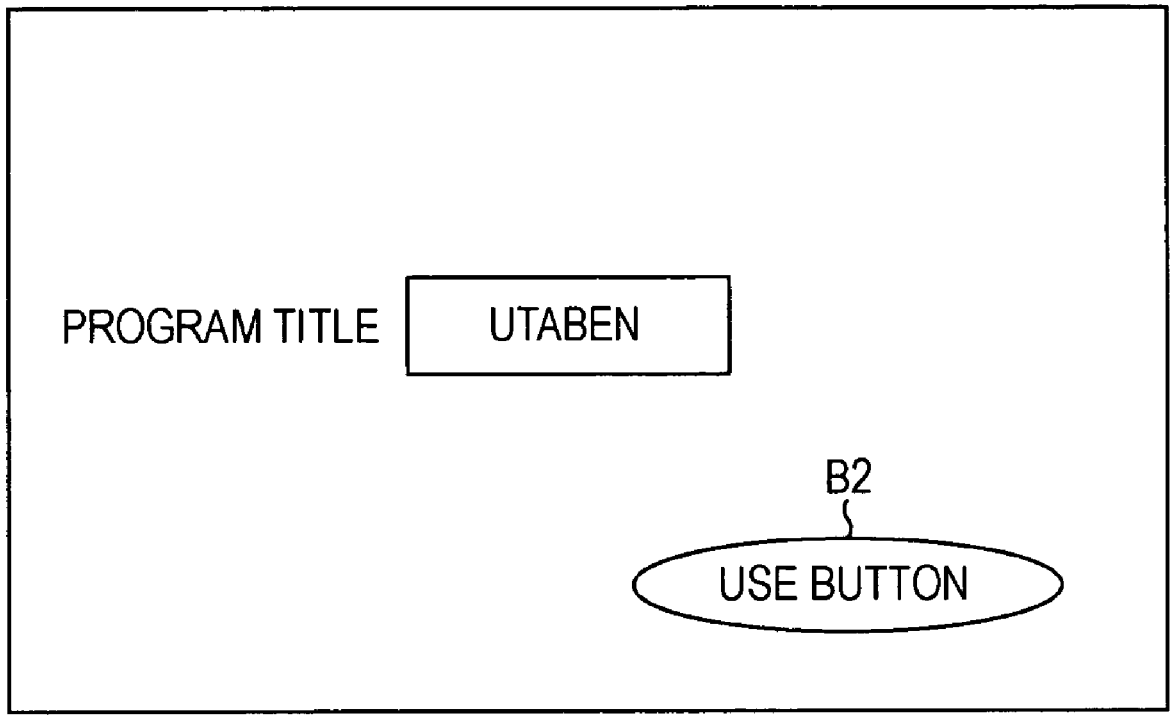
FIG. 11 is a diagram showing an example of a screen for specifying metadata to be reused.

Instead of operating the use button B2 on the content introduction screen, by entering a program title on a screen shown in FIG. 11 and operating a use button B2, an instruction for displaying a content-information input screen based on the reuse of the metadata used to generate a content introduction screen including the program title may be input.

In step S25, the content-information input screen generating unit 55 reads the metadata to be reused from the metadata storage unit 56.

Then, in step S26, the content-information input screen generating unit 55 uses the metadata read in step S25 to generate a content-information input screen, and supplies it to the control unit 52. The control unit 52 displays the content-information input screen supplied from the content-information input screen generating unit 55 on the display unit 58.

As a result, for example, the content-information input screen shown in FIG. 6 in which the predetermined content information has been entered is displayed. The user of the terminal 1 uses the content-information input screen to enter the content information.

If it is determined in step S24 that the metadata to be reused is not the metadata used to generate the content introduction screen generated in step S9 (the self-generated metadata), the process proceeds to step S27.

For example, in a state where a content introduction screen generated by a site that collects content information is displayed on the display unit 58, if the use button is operated, the process proceeds to step S27 through steps S21, S22, and S24.

In step S27, the content-information input screen generating unit 55 obtains metadata generated by another apparatus via the metadata obtaining unit 57, and determines whether or not the obtained metadata can be used to generate a content-information input screen. If it is determined that the obtained metadata can be used, the process proceeds to step S28.

In step S28, the content-information input screen generating unit 55 generates a content-information input screen using the obtained metadata, and displays the content-information input screen. That is, a content-information input screen in which predetermined content information has been entered is generated and displayed.

When a content-information input screen is displayed in step S23, S26, or S28, the process proceeds to step S2 of FIG. 4.

Accordingly, a content-information input screen can be generated using metadata that is used to generate a content introduction screen. Thus, a content-information input screen in which predetermined content information has been entered can be provided to a user. As a result, content information can be efficiently entered.

While the foregoing description has been given in the context of a television broadcast program, radio broadcasting and movie and music distribution services can also be employed.

In this specification, steps defining a program provided via a recording medium may include processes that are executed sequentially in the orders described, and also include processes that are executed in parallel or individually, not necessarily sequentially.

The invention claimed is:

1. An information processing apparatus for providing a program guide, to a terminal, on which program information concerning predetermined program is displayed, the information processing apparatus comprising:
    first generating means for generating a program-information input screen for inputting the program information;
    input means for inputting the program information through the program-information input screen;
    extracting means for extracting a plurality of link elements for a portion of the program information input by the input means;
    first storage means for storing link destinations of predetermined link elements;
    obtaining means for obtaining a link destination associated with each of the plurality of the link elements, one at a time, using the first storage means and/or an external search site; and
    second generating means for generating, as a function of a type of terminal, the program guide,
    wherein the program guide is generated after each of the plurality of link elements has been searched and verified, one at a time, and
    wherein the plurality of link elements are searched and verified by:
    determining whether or not a URL of a site related to the link element has been detected from a link-destination database, and
    wherein, if it is determined that the URL has not been detected, then, a search server is accessed, the search server searches for the site related to the link element,
    wherein, if the URL of the site related to the link element has been detected from the link-destination database, or if the site related to the link element is searched for by the search server:
    determining whether or not all of the link elements extracted have been selected,
    wherein, if it is determined that a remaining link element exists another link element is selected for processing, and
    wherein each of the link destinations are displayed as HTML links named as the link elements and linking to the searched and verified link destinations, and
        wherein the program guide is for programs to be broadcasted on the terminal.

2. The information processing apparatus according to claim 1, wherein the obtaining means uses the external search site to obtain a desired link destination when the link destination is not obtained from the first storage means.

3. The information processing apparatus according to claim 1, wherein the obtaining means determines the validity of a site of the link destination when obtaining the link destination using the external search site.

4. The information processing apparatus according to claim 1, further comprising:
    second storage means for storing the program information input by the input means and the link destination obtained by the obtaining means as metadata,
    wherein the first generating means uses the metadata stored in the second storage means to generate the program-information input screen in which predetermined program information has been entered.

5. The information processing apparatus according to claim 1, further comprising:
    metadata obtaining means for obtaining metadata generated by another information processing apparatus,
    wherein the first generating means uses the metadata obtained by the metadata obtaining means to generate the program-information input screen in which predetermined program information has been entered.

6. An information processing method for providing a program guide, to a terminal, on which program information concerning predetermined program is displayed, the information processing method comprising:
    a first generating step of generating a program-information input screen for inputting the program information;
    an inputting step of inputting the program information through the program-information input screen;
    an extracting step of extracting a plurality of link elements for a portion of the program information input in the processing of the inputting step;
    an obtaining step of obtaining a link destination associated with each of the plurality of the link elements, one at a time, as a function of a type of terminal, using storage means for storing link destinations of predetermined link elements and/or an external search site; and
    a second generating step of generating the, as a function of a type of terminal, program guide,
    wherein the program guide is generated after each of the plurality of link elements has been searched and verified, one at a time, and
    wherein the plurality of link elements are searched and verified by:
    determining whether or not a URL of a site related to the link element has been detected from a link-destination database, and wherein, if it is determined that the URL has not been detected, then, a search server is accessed, the search server searches for the site related to the link element, wherein, if the URL of the site related to the link element has been detected from the link-destination database, or if the site related to the link element is searched for by the search. server:

determining whether or not all of the link elements extracted have been selected, wherein, if it is determined that a remaining link element exists, another link element is selected for processing, and wherein each of the link destinations are displayed as HTML links named as the link elements and linking to the searched and verified link destinations, and wherein the program guide is for programs to be broadcasted on the terminal.

7. A program stored on a non-transitory computer readable medium, for providing a program guide, to a terminal, on which program information concerning predetermined program is displayed, the program causing a computer to execute a process comprising:

a first generating step of generating a program-information input screen for inputting the program information;

an inputting step of inputting the program information through the program-information input screen;

an extracting step of extracting a plurality of link elements for a portion of the program information input in the processing of the inputting step;

an obtaining step of obtaining a link destination associated with each of the plurality of the link elements, one at a time, using storage means for storing link destinations of predetermined link elements and/or an external search site; and a second generating step of generating, as a function of a type of terminal, the program guide, wherein the program guide is generated after each of the plurality of link elements has been searched and verified, one at a time, and wherein the plurality of link elements are searched and verified by:

determining whether or not a URL of a site related to the link element has been detected from a link-destination database, and wherein, if it is determined that the URL has not been detected, then, a search server is accessed, the search server searches for the site related to the link element, wherein, if the URL of the site related to the link element has been detected from the link-destination database, or if the site related to the link element is searched for by the search. server:

determining whether or not all of the link elements extracted have been selected, wherein, if it is determined that a remaining link element exists, another link element is selected for processing, and wherein each of the link destinations are displayed as HTML links named as the link elements and linking to the searched and verified link destinations, and wherein the program guide is for programs to be broadcasted on the terminal.

8. A recording medium having recorded thereon a program for providing a program guide, to a terminal, on which program information concerning predetermined program is displayed, the program causing a computer to execute a process comprising:

a first generating step of generating a program-information input screen for inputting the program information;

an inputting step of inputting the program information through the program-information input screen;

an extracting step of extracting a plurality of link elements for a portion of the program information input in the processing of the inputting step;

an obtaining step of obtaining a link destination associated with each of the plurality of the link elements, one at a time, using storage means for storing link destinations of predetermined link elements and/or an external search site; and a second generating step of generating, as a function of a type of terminal, the program guide, wherein the program guide is generated after each of the plurality of link elements has been searched and verified, one at a time, and wherein the plurality of link elements are searched and verified by:

determining whether or not a URL of a site related to the link element has been detected from a link-destination database, and wherein, if it is determined that the URL has not been detected, then, a search server is accessed, the search server searches for the site related to the link element, wherein, if the URL of the site related to the link element has been detected from the link-destination database, or if the site related to the link element is searched for by the search server:

determining whether or not all of the link elements extracted have been selected, wherein, if it is determined that a remaining link element exists, another link element is selected for processing, and wherein each of the link destinations are displayed as HTML links named as the link elements and linking to the searched and verified link destinations, and wherein the program guide is for programs to be broadcasted on the terminal.

9. An information processing apparatus for providing a program guide, to a terminal, on which program information concerning predetermined program is displayed, the information processing apparatus comprising:

a first generating unit that generates a program-information input screen for inputting the program information;

an input unit that inputs the program information through the program-information input screen;

an extracting unit that extracts a plurality of link elements for a portion of the program information input by the input unit;

a storage unit that stores link destinations of predetermined link elements;

an obtaining unit that obtains a link destination associated with each of the plurality of the link elements, one at a time, using the storage unit and/or an external search site; and a second generating unit that generates, as a function of a type of terminal, the program guide, wherein the program guide is generated after each of the plurality of link elements has been searched and verified, one at a time, and wherein the plurality of link elements are searched and verified by:

determining whether or not a URL of a site related to the link element has been detected from a link-destination database, and wherein, if it is determined that the URL has not been detected, then, a search server is accessed, the search server searches for the site related to the link element, wherein, if the URL of the site related to the link element has been detected from the link-destination database, or if the site related to the link element is searched for by the search server:

determining whether or not all of the link elements extracted have been selected, wherein, if it is determined that a remaining link element exists, another link element is selected for processing, and wherein each of the link destinations are displayed as HTML links named as the link elements and linking to the searched and verified link destinations, and wherein the program guide is for programs to be broadcasted on the terminal.

* * * * *